(12) United States Patent
Alhajri

(10) Patent No.: US 8,342,332 B2
(45) Date of Patent: Jan. 1, 2013

(54) PORTABLE LABORATORY FOR A BIOLOGY COURSE AND EXPERIMENTS

(76) Inventor: Munirah Abdullah Alhajri, Safat (KW)

( * ) Notice: Subject to any disclaimer, the term of this patent is extended or adjusted under 35 U.S.C. 154(b) by 119 days.

(21) Appl. No.: 13/043,827

(22) Filed: Mar. 9, 2011

(65) Prior Publication Data

US 2012/0228189 A1    Sep. 13, 2012

(51) Int. Cl.
*B65D 85/67* (2006.01)
*B65D 69/00* (2006.01)
*B65D 85/38* (2006.01)
*G09B 23/00* (2006.01)

(52) U.S. Cl. ........ 206/579; 206/216; 206/232; 206/305; 206/316.1; 206/569; 434/295

(58) Field of Classification Search .......... 206/216–233, 206/305, 316.1, 456, 568–582; 190/16, 17, 190/119–121; 434/276, 295–298
See application file for complete search history.

(56) References Cited

U.S. PATENT DOCUMENTS

| | | | | |
|---|---|---|---|---|
| 1,350,237 | A | * | 8/1920 | Porter ........................ 434/298 |
| 3,066,790 | A | * | 12/1962 | Armbruster .................. 206/305 |
| 3,416,852 | A | * | 12/1968 | Goldbeck et al. ............. 206/305 |
| 3,861,556 | A | * | 1/1975 | Barecki et al. ............... 206/216 |
| 4,515,493 | A | | 5/1985 | Radovich |
| 5,010,988 | A | | 4/1991 | Brown |
| 5,105,338 | A | | 4/1992 | Held |
| 5,242,056 | A | | 9/1993 | Zia et al. |
| 5,725,090 | A | | 3/1998 | Vermillion et al. |
| 5,944,532 | A | * | 8/1999 | Lienhop ........................ 434/295 |
| 6,134,105 | A | | 10/2000 | Lucker |
| 6,761,255 | B2 | | 7/2004 | Clements et al. |
| 7,422,476 | B2 | | 9/2008 | Marmaropoulos et al. |
| 2012/0064515 | A2 | * | 3/2012 | Knapp et al. ................. 206/569 |

FOREIGN PATENT DOCUMENTS

GB        2091692 A    *    8/1982

* cited by examiner

*Primary Examiner* — Bryon Gehman
(74) *Attorney, Agent, or Firm* — Lowe Hauptman Ham & Berner, LLP

(57) ABSTRACT

A portable laboratory for an intermediate or secondary biology course and experiments relating to the course includes a carrying case of the type having an impervious sturdy cover and a closeable interior containing a first and second inner panel. The laboratory also includes a relatively small portable microscope having a zoom optical system, a dissecting box and tray, a spirit lamp, a digital camera and numerous items typically found in a secondary school laboratory all of which are releaseably fastened to one of the panels. The portable laboratory also includes test strips for testing glucose in urine as well as a number of microscope slides, many of which are prepared slides and other elements for conducting experiments for a course together with a laboratory manual and CD containing text material.

5 Claims, 1 Drawing Sheet

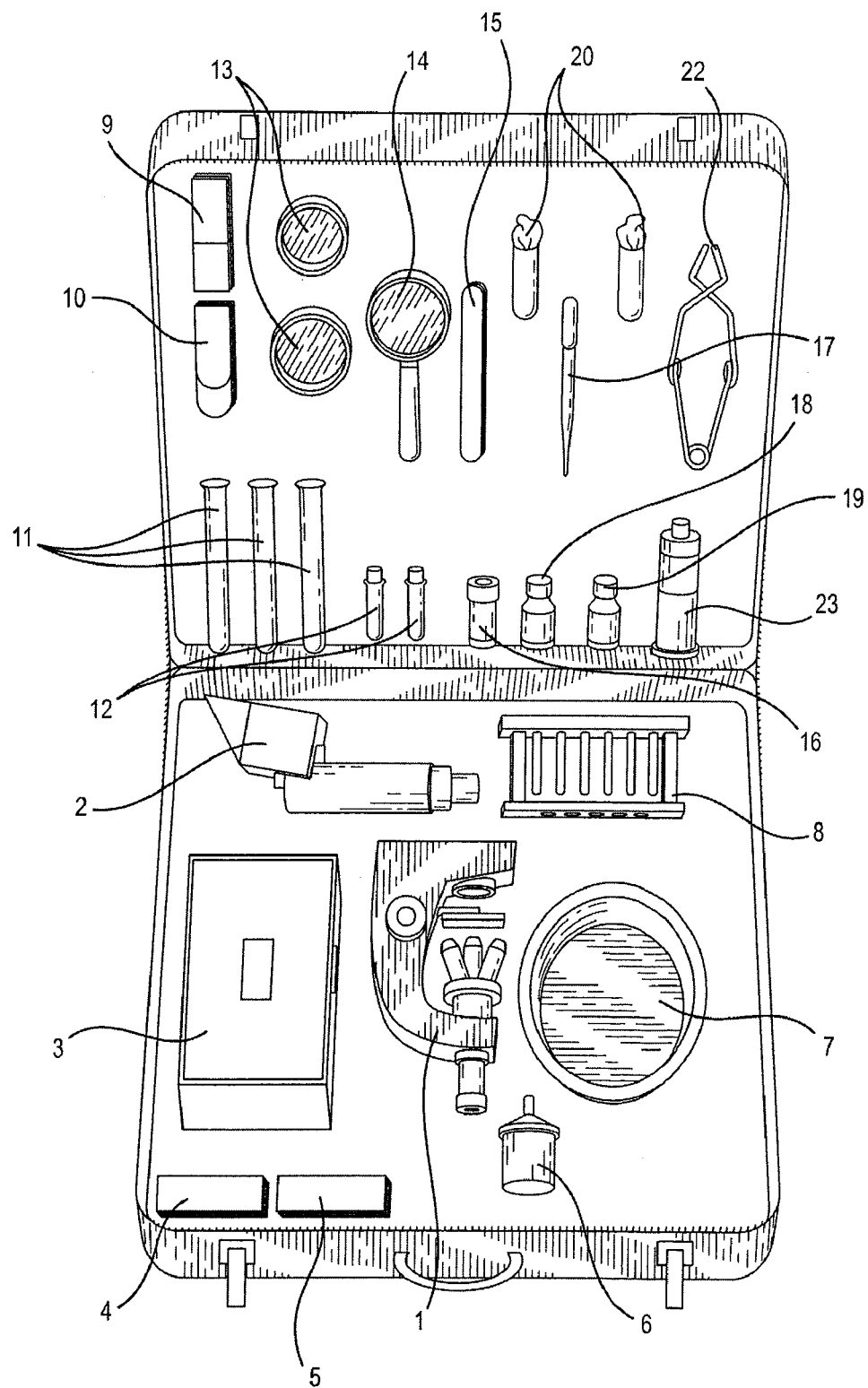

PORTABLE LABORATORY FOR A BIOLOGY COURSE AND EXPERIMENTS

FIELD OF THE INVENTION

This invention relates to a portable laboratory for a biology course and experiments and more particularly to a portable laboratory for an intermediate or secondary biology course and experiments for supporting such courses.

BACKGROUND FOR THE INVENTION

The use of carrying cases of varying kinds is becoming more prevalent and more people find it convenient and even necessary to take work with them as they move about or require large amounts of information at hand to perform their work. Accordingly, although the usual kinds of cases such as attaché cases, briefcases, carrying cases for laptop computers are most commonly used there has developed an increasing need for specialized cases for facilitating the carrying out of various tasks.

Portable laboratories for analyzing biological substances are also known and have been in use for a number of years. For example, a U.S. Patent of Bell et al., U.S. Pat. No. 7,503,229 discloses a briefcase for sampling air and collecting particles entrained in the air. The biobriefcase includes a receiving surface, a liquid input that directs liquid to the receiving surface, and produces a liquid surface, an air input that directs the air so that the air with particles entrained in the air impact the liquid surface.

A further approach to a laboratory in a briefcase was disclosed by the United Nations Office on Drugs and Crime (UNODC). To conduct spot checks, the UNODC has developed "Field Test Kits" in a brief case that provides law enforcement officers with rapid and simple color tests for the preliminary field identification of drugs and precursors most commonly encountered in illicit traffic. These kits contain chemical agents for the identification of cannabis, opium, morphine, cocaine, and heroine and sufficient re-agents to carry out 500 tests.

Finally, Biopac System Inc. has announced a Biopac Science Lab for secondary education to provide hands on physiology lessons to explore the inner workings of the human body with a new inexpensive physiological monitor that was specially designed for secondary education. It allows students to display, record and analyze their own heart signals (ECG), brain waves (EEG), muscle activity (EMG) and eye movement (EOG).

Notwithstanding the above, it is presently believed that there is a need and a potential commercial market for a portable laboratory for a biology course that can be used to perform routine experiments independent of a traditional school laboratory. There should be a need and a potential market for such portable laboratories since they contain the basics for an intermediate or secondary course in biology. Further, such portable laboratories can be carried to and used in the home, easily moved to a friends house in order to work on experiments with another student.

BRIEF SUMMARY OF THE INVENTION

In essence a portable laboratory for a biology course or experiments associated therewith includes a carry case having a frame and a flexible impervious material covering the frame. The carry case includes a first inner/outer panel, a second inner/outer panel, a surrounding sidewall structure connecting the first and second panels in an enclosing relationship to an interior of the case and means for opening and closing the case. A relatively small portable zoom microscope and means for releaseably holding the microscope to a first of the panels, a dissecting tray and means for releaseably holding the dissecting tray to the first panel as well as a spirit lamp and means for releaseably holding the spirit lamp to the first panel. In addition, a test tube stand and means for releaseably holding the test tube stand to the first panel, a digital camera and eye piece and means for holding the digital camera and eye piece to the first of the panels, a dissecting box, means for releaseably holding the dissecting box to the first panel and a plurality of microscope slides and means for means for removeably holding the plurality of microscope slides to the first panel are provided. In addition, a plurality of large and small test tubes are provided and means such as a plurality of clips are fixed to the second panel for releaseably holding the large and small test tubes to the second panel are included. The laboratory also includes a Petri dish removeably fixed to the second panel; a plurality of magnifying lenses, a plurality of wood sticks and means for releaseably holding the fasting means for holding the plurality of magnifying lenses and plurality of wood sticks to the second panel are included. Further, a pipette, means for releaseably holding the pipette to the second panel and a pair of gloves together with means releaseably holding the pair of gloves are provided. Still further, a test tube holder, means for releaseably holding the test tube holder to the second panel and filter paper and test tubes for testing glucose in urine and means for holding the filter paper and test tubes to the second panel are provided. Finally, containers of iodine solution, blue metholene solution and distilled water as well as means for releaseably holding the containers of iodine solution, blue metholene solution and distilled water to the second panel.

The invention will now be described in connection with the accompanying drawing wherein like reference numerals have been used to indicate like parts.

DESCRIPTION OF THE DRAWINGS

FIG. 1 is a schematic is a schematic illustration of a portable biology laboratory for intermediate or secondary biology students.

DESCRIPTION OF THE PREFERRED EMBODIMENTS OF THE INVENTION

A preferred embodiment of the invention will now be described in connection with FIG. 1. As illustrated, a portable laboratory 20 in accordance with a preferred embodiment of the invention includes a carry case 22 shown in an open position together with the contained equipment and ingredients in the carry case 22. As shown, the carry case includes a frame 24 and a flexible impervious material such as nylon 26 covering the frame 24. The case includes a first inner/outer panel 28, a second inner and outer panel 30 and a surrounding side wall structure 32 connecting the first and second panels in an enclosing relationship to form an impervious interior of the case with a zipper 34 for opening and closing the case. The zipper runs from one side of the case to the opposite side so that the two panels can be laid out on a table with the equipment or elements and containers of solutions fixed to the first and second panels 28 and 30.

A portable zoom portable zoom microscope 41 with a zoom optical system and fastener means 41' including a clip fastening the microscope to the first panel for releaseably holding the portable microscope to the first panel 28 are provided. A dissecting tray 42 and a fastening clip 42' removeably fix the dissecting tray to the first panel. A sprit lamp 43 and a fastening clip 43' removeably fix the spirit lamp to the first panel. In addition, a test tube stand 44 and a fastening clip 44' releasably fasten the test tube stand to the first panel. Further, a digital camera and eye piece 45 and fastening clip 45' removeably fasten the digital camera and eye piece to the first panel 28. A dissecting box 46 and fastening clip 46' removeably fasten the dissecting box to the first panel. Finally, a plurality of microscope slides 47 and a fastening member 47' removeably fasten the microscope slides 47 to the first panel 28 so that the slides can be removed for examination under the microscope.

A plurality of large and small test tubes 50 are provided and fastening means 50' removeably fasten the test tubes 50 to the second panel 30. In addition a Petri dish 51 and a plurality of wooden sticks 52 are provided as well as fastening means 51' for removeably fastening the Petri dish 5 1 and the wood sticks 52 to the second panel 30. Further, a plurality of lenses 53 and a pipette 54 are also provided together with fastening means 54' for removeably fastening the plurality of lenses, wood sticks and pipette to the second panel 30. Further, a pair of gloves 55 and fastening means 55' removeably fasten the gloves to the second panel. Also, a test tube holder 56 and means 56' for removeably fastening the test tube holder to the second panel are provided. Finally, twenty five sheets of filter paper 57 and fifty test strips 58 for testing urine for glucose as well as a number of test solutions 59 and distilled water 60 are included in the laboratory and are removeably fastened by appropriate fasteners 60' to the second panel.

In summary the carry case 22 includes the following list of elements in the following amounts:

| Name | Nos. |
|---|---|
| Portable Microscope | 1 |
| Digital Camera Eyepiece | 1 |
| Dissecting Box | 1 |
| Microscope Slides | 12 |
| Prepared Slides | 13 |
| Spirit Lamp | 1 |
| Dissecting Tray | 1 |
| Test Tube stand | 1 |
| Glucose Test By Urine | 50 |
| Filter Paper | 25 |
| BigTestTube | 4 |
| Small Test Tubes | 2 |
| Petri Dish | 2 |
| Magnifying Lenses | 1 |
| Wooden sticks | 4 |
| Eyepiece | 1 |
| Pipette | 1 |
| Iodine solution | 1 |
| Blue methylene Solution | 1 |
| Gloves | 2 |
| Microscopic Covered Glass | 15 |
| Test Tube Holder | 1 |
| Distilled Water | 1 |

The prepared slides include the following:

Prepared Slides

Artery T.S.
Vein T.S.
Mammal Intestine .L.S
Un Straited Muscles
Cardiac Muscles
Plant Cell W.M.
Animal Cell W.M.
Bactria Sprillum Form
Paramecium W.M.
Amoeba Proteus W.M.
Rhizopus W.M
Euglena W.M.

In addition to the above, the carry case includes a laboratory manual and CD containing text material.

While the invention has been described in connection with its preferred embodiment it should be recognized that changes and modifications may be made therein without departing from the scope of the appended claims.

What is claimed is:

1. A portable laboratory for a biology course or experiment, said portable laboratory comprising:
   a carry case having a frame and flexible impervious material covering said frame;
   a first inner and outer panel;
   a second inner and outer panel;
   a surrounding sidewall structure connecting said first and said second panels in an enclosing relationship to form an interior of said case and means for opening and closing said case;
   a portable microscope and means for removeably holding said microscope to said first panel;
   a dissecting tray and means for removeably holding said dissecting tray to said first panel;
   a spirit lamp;
   means for removeably holding said spirit lamp to said first panel;
   a test tube stand and means for removeably fastening said test tube stand to said first panel;
   a digital camera and eyepiece and means for releaseably holding said digital camera and said eyepiece to said first panel;
   a dissecting box and means for removeably holding said dissecting box to said first of said panels and a plurality of microscope slides and means for removeably holding said plurality of microscope slides to said first panel;
   a large test tube and a plurality of small test tubes and fastening means for removeably fastening said large test tube and plurality of small test tubes to said second panel;
   a Petri dish and means for releaseably holding said Petri dish to said second panel;
   a plurality of magnifying lenses;
   a plurality of wood sticks and means for releaseably holding said plurality of magnifying lenses and said plurality of wood sticks to said second panel;
   a pipette and means for releaseably holding said pipette to said second panel;
   a pair of gloves;
   means removeably holding said pair of gloves to said second panel;
   a test tube holder;
   means for holding said test tube holder to said second panel;
   filter paper and test strips for testing glucose in urine;
   means for releaseably holding said filter paper and test strips to said second panel;
   a closeable container of iodine solution, a closeable container of blue methylene solution and a closeable container of distilled water; and
   means for releaseably fastening said containers of iodine solution, blue methylene solution and distilled water to said second panel.

2. A portable laboratory for a biology course or experiment according to claim 1 which includes 12 microscope slides, 13 prepared microscope slides, 50 test strips for glucose in urine, 25 sheets of filter paper, 4 large test tubes, 2 small test tubes, 2 pairs of gloves and 15 microscope glass covers.

3. A portable laboratory for at least one of an intermediate and a secondary course in biology and experiments for such courses comprising:

a carry case with a frame and a flexible impervious material covering said frame and a first outer and interior panel, a second outer and interior panel, a surrounding sidewall structure connecting said first of said second panels in an enclosing relationship to form an interior of said case and a zipper for opening and closing said case;

a portable microscope with a zoom optical system, clip means fixed to said first panel for removeably holding said portable microscope to said first panel, a dissecting tray and clip means removeably fixing said dissecting tray to said first panel, a spirit lamp and clip means fixed to said first panel for holding removeably holding said spirit lamp to said first panel, a test tube stand and clip means fixed to said first panel for releaseably holding said test tube stand to said first panel, a digital camera and eyepiece and clip means fixed to said first panel for releaseably holding said digital camera and eyepiece to said first panel, a dissecting box and clip means fixed to said first panel for releaseably holding said dissecting box to said first panel and a plurality of microscope slides and fastening straps for removeably holding said plurality of microscope sides to said first panel and wherein said microscope slides include a plurality of prepared slides for viewing by a student; and four large test tubes and two small test tubes and clip means fixed to said second panel for releaseably holding said large test tubes and small test tubes to said second panel, a Petri dish and fastening means for releaseably fastening said Petri dish to said second panel, a plurality of magnifying lenses, a plurality of wood sticks and means fixed to said second panel for releaseably fastening said plurality of lenses and plurality of wood sticks to said second panel, a pipette and fastening means fixed to said second panel for releaseably fastening said pipette to said second panel, a pair of gloves and strap fastening means fixed to said second panel for releaseably fastening said gloves to said second panel, a test tube holder and means fixed to said second panel for releaseably holding said test tube holder to said second panel, 25 sheets of filter paper and 50 test strips for testing urine for glucose and fastening means fixed to said second panel for releaseably fastening said filter paper and said test strips to said second panel and a laboratory manual and CD containing text material for the at least one course included in said portable laboratory.

4. A portable laboratory for at least one of an intermediate and a secondary course in biology according to claim 3 which includes a laboratory manual including a number of experiments to be conducted with a CD including the contents of said laboratory.

5. A portable laboratory for at least one of an intermediate and a secondary course in biology according to claim 4 which includes a disc containing the subject matter for a biology course.

\* \* \* \* \*